United States Patent
Grussling et al.

(10) Patent No.: US 9,900,206 B2
(45) Date of Patent: Feb. 20, 2018

(54) COMMUNICATION DEVICE WITH PERSISTENT CONFIGURATION AND VERIFICATION

(71) Applicant: Schweitzer Engineering Laboratories, Inc., Pullman, WA (US)

(72) Inventors: Barry Jakob Grussling, Pullman, WA (US); Jason A. Dearien, Moscow, ID (US); Ryan Bradetich, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 288 days.

(21) Appl. No.: 14/803,810

(22) Filed: Jul. 20, 2015

(65) Prior Publication Data

US 2017/0026226 A1    Jan. 26, 2017

(51) Int. Cl.
*H04L 12/28* (2006.01)
*H04L 12/24* (2006.01)
(Continued)

(52) U.S. Cl.
CPC ............ *H04L 41/0654* (2013.01); *H04L 9/08* (2013.01); *H04L 41/0672* (2013.01);
(Continued)

(58) Field of Classification Search
CPC . H04L 41/0654; H04L 1/0853; H04L 49/254; H04L 45/22; H04L 9/08
See application file for complete search history.

(56) References Cited

U.S. PATENT DOCUMENTS 6,747,957 B1    6/2004  Pithawala
7,218,632 B1    5/2007  Bechtolsheim
(Continued)

FOREIGN PATENT DOCUMENTS

| EP | 2765751 | 8/2014 |
| KR | 20150051107 | 5/2015 |
| WO | 2015038040 | 3/2015 |

OTHER PUBLICATIONS

Braun, Wolfgang, Menth, Michael, Software-Defined Networking Using OpenFlow: Protocols, Applications and Architectural Design Choices, Future Internet, May 12, 2014.
(Continued)

*Primary Examiner* — Melanie Jagannathan
(74) *Attorney, Agent, or Firm* — Jared L. Cherry; Richard M. Edge (57) ABSTRACT

The present disclosure pertains to systems and methods for establishing communication with a remote communication device in a software defined network (SDN) during time when an SDN controller is unavailable. In one embodiment, a local communication device may be configured to receive a plurality of data flows from an SDN controller and to store the plurality of data flows in a persistent data memory. The device may generate a unique identifier for the local communication device that is transmitted to a remote communication device. Following a disruption the results in the SDN controller being unavailable, the local communication device may recover into a default configured state based on the plurality of data flows in the persistent data memory. The local communication device may then transmit the unique identifier to the remote communication device after the disruption to begin a process of reestablishing communication with the remote communication device.

20 Claims, 5 Drawing Sheets

(51) Int. Cl.
*H04L 9/08* (2006.01)
*H04L 12/707* (2013.01)
*H04L 12/703* (2013.01)
*H04L 12/717* (2013.01)

(52) U.S. Cl.
CPC .............. *H04L 45/22* (2013.01); *H04L 45/28* (2013.01); *H04L 45/42* (2013.01)

(56) References Cited

U.S. PATENT DOCUMENTS

| | | | |
|---|---|---|---|
| 7,376,831 | B2 | 5/2008 | Kollmyer |
| 7,872,983 | B2 | 1/2011 | Lai |
| 8,553,544 | B2 | 10/2013 | Lai |
| 8,800,044 | B2 | 8/2014 | Raad |
| 9,038,151 | B1 | 5/2015 | Chua |
| 9,237,129 | B2 | 1/2016 | Ling |
| 9,286,171 | B2 | 3/2016 | Cardona |
| 9,432,255 | B1* | 8/2016 | Hasan ................ H04L 41/0816 |
| 9,432,380 | B2* | 8/2016 | Margalit .............. H04L 63/105 |
| 9,680,588 | B2* | 6/2017 | Connolly ............ H04L 41/0803 |
| 9,686,125 | B2 | 6/2017 | Smith |
| 9,769,060 | B2 | 9/2017 | Dearien |
| 2002/0172157 | A1 | 11/2002 | Rhodes |
| 2003/0112821 | A1 | 6/2003 | Cleveland |
| 2003/0125924 | A1 | 7/2003 | Lines |
| 2003/0133443 | A1 | 7/2003 | Klinker |
| 2003/0188159 | A1 | 10/2003 | Josset |
| 2005/0025141 | A1 | 2/2005 | Chao |
| 2005/0078672 | A1 | 4/2005 | Caliskan |
| 2005/0192008 | A1 | 9/2005 | Desai |
| 2008/0005558 | A1 | 1/2008 | Hadley |
| 2008/0080384 | A1 | 4/2008 | Atkins |
| 2009/0257743 | A1 | 10/2009 | Chung |
| 2009/0285093 | A1 | 11/2009 | Bolt |
| 2009/0313189 | A1 | 12/2009 | Sun |
| 2010/0241608 | A1 | 9/2010 | Huang |
| 2011/0085567 | A1 | 4/2011 | Beecroft |
| 2011/0087952 | A1 | 4/2011 | Mahn |
| 2013/0077477 | A1 | 3/2013 | Daraiseh |
| 2013/0108259 | A1 | 5/2013 | Srinivas |
| 2013/0159865 | A1 | 6/2013 | Smith |
| 2013/0212285 | A1 | 8/2013 | Hoffmann |
| 2013/0250770 | A1 | 9/2013 | Zou |
| 2013/0263247 | A1 | 10/2013 | Jungck |
| 2013/0294228 | A1 | 11/2013 | Ahuja |
| 2014/0025945 | A1 | 1/2014 | McGrew |
| 2014/0029451 | A1 | 1/2014 | Nguyen |
| 2014/0064100 | A1 | 3/2014 | Edwards et al. |
| 2014/0112130 | A1 | 4/2014 | Yang et al. |
| 2014/0115706 | A1 | 4/2014 | Silva et al. |
| 2014/0129700 | A1 | 5/2014 | Mehta |
| 2014/0153572 | A1 | 6/2014 | Hampel |
| 2014/0160939 | A1 | 6/2014 | Arad |
| 2014/0226467 | A1 | 8/2014 | Park |
| 2014/0241345 | A1 | 8/2014 | DeCusatis |
| 2014/0245387 | A1 | 8/2014 | Colpo |
| 2014/0280834 | A1 | 9/2014 | Medved |
| 2014/0325038 | A1* | 10/2014 | Kis .................... H04L 41/0803 709/220 |
| 2014/0325649 | A1 | 10/2014 | Zhang |
| 2014/0371941 | A1 | 12/2014 | Keller et al. |
| 2014/0376406 | A1 | 12/2014 | Kim |
| 2015/0081762 | A1 | 3/2015 | Mason et al. |
| 2015/0112933 | A1 | 4/2015 | Satapathy |
| 2015/0195190 | A1 | 7/2015 | Shah Heydari |
| 2015/0312658 | A1 | 10/2015 | Winzer |
| 2015/0363522 | A1 | 12/2015 | Maurya |
| 2016/0043996 | A1 | 2/2016 | Syed Mohamed |
| 2016/0119299 | A1 | 4/2016 | Amulothu |
| 2016/0142427 | A1 | 5/2016 | de los Reys |
| 2016/0165454 | A1 | 6/2016 | Li |
| 2016/0330076 | A1 | 11/2016 | Tiwari |
| 2016/0337247 | A1* | 11/2016 | Yao ..................... H04L 12/6418 |
| 2016/0344592 | A1 | 11/2016 | Cook |
| 2017/0026225 | A1 | 1/2017 | Smith |
| 2017/0026226 | A1 | 1/2017 | Grussling |
| 2017/0026243 | A1* | 1/2017 | Berner .................... H04L 45/42 |
| 2017/0026252 | A1 | 1/2017 | Dearien |
| 2017/0026276 | A1 | 1/2017 | Dearien |
| 2017/0026291 | A1 | 1/2017 | Smith |
| 2017/0026292 | A1* | 1/2017 | Smith .................... H04L 43/16 |
| 2017/0026349 | A1 | 1/2017 | Smith |

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tal, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

PCT/US2016/038139 Patent Cooperation Treaty, International Search Report and Written Opinion of the International Searching Authority, dated Sep. 9, 2016.

PCT/US2016/038419 Patent Cooperation Treaty, International Search Report and Written Opinion of the International Searching Authority, dated Aug. 30, 2016.

PCT/US2016/039582 Patent Cooperation Treaty, International Search Report and Written Opinion of the International Searching Authority, dated Feb. 8, 2017.

PCT/US2016/039081 Patent Cooperation Treaty, International Search Report and Written Opinion of the International Searching Authority, dated Sep. 8, 2016.

PCT/US2016/039079 Patent Cooperation Treaty, International Search Report and Written Opinion of the International Searching Authority, dated Oct. 12, 2016.

\* cited by examiner

COMMUNICATION DEVICE WITH PERSISTENT CONFIGURATION AND VERIFICATION

FEDERALLY SPONSORED RESEARCH OR DEVELOPMENT

This invention was made with U.S. Government support under Contract No.: DOE-OE0000678. The U.S. Government may have certain rights in this invention.

TECHNICAL FIELD

The present disclosure pertains to systems and methods for improving the security and responsiveness of a software defined network ("SDN"). More specifically, but not exclusively, various embodiments consistent with the present disclosure may be applied to communication devices used in electric power transmission and distribution systems that include persistent configuration information that enables the device to directly establish communication with a remote device following an event that disrupts communication with an SDN controller.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Modern electric power distribution and transmission systems may incorporate a variety of communication technologies that may be used to monitor and protect the system. A variety of types of communication equipment may be configured and utilized to facilitate communication among a variety of devices that monitor conditions on the power system and implement control actions to maintain the stability of the power system. The communication networks carry information necessary for the proper assessment of power system conditions and for implementing control actions based on such conditions. In addition, such messages may be subject to time constraints because of the potential for rapid changes in conditions in an electric power transmission and distribution system.

When a communication system associated with an electric power distribution and transmission system suffers a disruption (e.g., a loss of power, an equipment malfunction, loss of a communication line, etc.), functioning of the power system may be impeded. In particular, a communication system associated with the power system may draw power from the associated power system, and accordingly, may go down whenever the power system loses power. Following a disruption, the communication equipment should recover quickly so that the communication functions needed for control and monitoring of the electrical system are promptly restored. Depending on the nature of the disruption, the communication system may even be able to continue operation in spite of the disruption.

Given that the communication systems may be complex and may involve a variety of components, restoring a communication system to operation following a disruption may require up to several minutes. For example, some electric power transmission and distribution systems may incorporate software defined networking ("SDN") technologies that utilize a controller to regulate communications on the network. SDN networking technologies offer a variety of advantages that are advantageous in electric power systems (e.g., deny-by-default security, latency guarantees, deterministic transport capabilities, redundancy and fail over planning, etc.); however, because SDN technologies typically rely on a controller to coordinate communication on the network, promptly restoring communication following a failure may be challenging.

An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be used to achieve the optimal usage of network resources by creating specific data flows through the communication network. A data flow, as the term is used herein, refers to a set of parameters used to match and take action based on network packet contents. Data flows may permit determinist paths based on a variety of criteria and may offer significant control and precision to operators of the network. In contrast, in large traditional networks, trying to match a network discovered path with an application desired data path may be a challenging task involving changing configurations in many devices. To compound this problem, the management interfaces and feature sets used on many devices are not standardized. Still further, network administrators often need to reconfigure the network to avoid loops, gain route convergence speed, and prioritize a certain class of applications.

Significant complexity in managing a traditional network in the context of an electric power transmission and distribution system arises from the fact that each network device (e.g., a switch or router) has control logic and data forwarding logic integrated together. For example, in a traditional network router, routing protocols such as Routing Information Protocol (RIP) or Open Shortest Path First (OSPF)

constitute the control logic that determines how a packet should be forwarded. The paths determined by the routing protocol are encoded in routing tables, which are then used to forward packets. Similarly, in a Layer 2 device such as a network bridge (or network switch), configuration parameters and/or Spanning Tree Algorithm (STA) constitute the control logic that determines the path of the packets. Thus, the control plane in a traditional network is distributed in the switching fabric (network devices), and as a consequence, changing the forwarding behavior of a network involves changing configurations of many (potentially all) network devices.

In an SDN, a controller embodies the control plane and determines how packets (or frames) should flow (or be forwarded) in the network. The controller communicates this information to the network devices, which constitute the data plane, by setting their forwarding tables. This enables centralized configuration and management of a network. As such, the data plane in an SDN consists of relatively simple packet forwarding devices with a communications interface to the controller to receive forwarding information. In addition to simplifying management of a network, an SDN architecture may also enable monitoring and troubleshooting features that may be beneficial for use in an electric power distribution system, including but not limited to: mirroring a data selected flow rather than mirroring a whole port; alarming on bandwidth when it gets close to saturation; providing metrics (e.g., counters and meters for quality of service, packet counts, errors, drops, or overruns, etc.) for a specified flow; permitting monitoring of specified applications rather than monitoring based on VLANs or MAC addresses.

In spite of several advantages, SDN networks may present certain challenges associated with recovering from a disruption. For example, after a loss of power or loss of connectivity with an SDN controller, a substantial amount of time (e.g., several minutes) may be required to restore full functionality even under favorable conditions. The controller in an SDN is frequently embodied as a program operating on a computer system that must reboot following a loss of power. After the controller is fully rebooted and in operation, discovering and programming the network may require additional time. In some cases, discovering and programming the network may require several additional minutes to complete. Still further, in some cases a network controller may be damaged or communication between the controller and a data plane may be disrupted, and accordingly, the controller may become unavailable. In such cases, communication channels regulated by the controller may be disabled.

Embodiments consistent with the present disclosure may be utilized in a variety of communication devices. A communication device, as the term is used herein, is any device that is capable of accepting and forwarding data traffic in a data communication network. In addition to the functionality of accepting and forwarding data traffic, communication devices may also perform a wide variety of other functions and may range from simple to complex devices. Communication devices according to the present disclosure may retain configuration information relating to established communication paths such that reprogramming of each device is not necessary following a loss of power. Further, the communication devices may be configured to return to a default configured state and implement certain communication functions after verify the identity of neighboring devices. Verification of the identity of neighboring devices may improve the security of the network by providing a mechanism for detecting changes in the network's configuration. Devices that return to a default configured state may reestablish communication flows with the neighboring device in order to reduce the time needed to recover following a disruption. As the communication network recovers the default configured state may be modified or the features implemented by the communication device may be augmented so that the communication network returns to full operation.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

Figure 1:
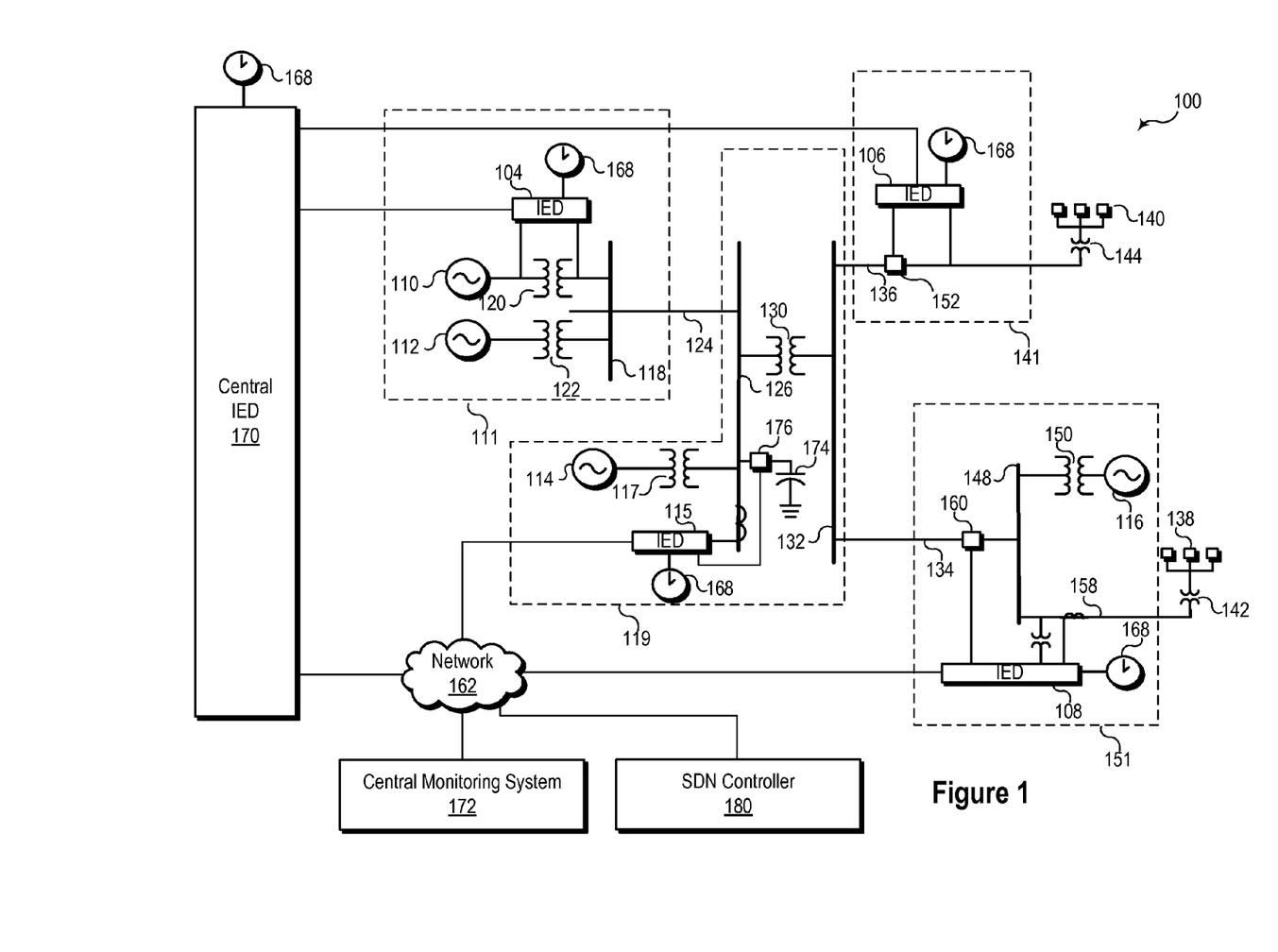
FIG. 1 illustrates a simplified one-line diagram of an electric power transmission and distribution system in which an SDN may enable data communication among a plurality of devices consistent with embodiments of the present disclosure.

FIG. 1 illustrates a simplified one-line diagram of an electric power transmission and distribution system 100 in which an SDN may enable data communication among a plurality of devices consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

An SDN controller 180 may be configured to interface with equipment in network 162 to create an SDN that facilitates communication between IEDs 170, 115, 108, and monitoring system 172. In various embodiments, SDN controller 180 may be configured to interface with a control plane (not shown) in network 162. Using the control plane, controller 180 may be configured to direct the flow of data within network 162.

In the event of a disruption (e.g., a loss of power, failure of a communication link, etc.) network 162 faces the possibility of downtime; however, systems and methods consistent with the present disclosure may be utilized to minimize or avoid downtime depending on the nature of the disruption. A plurality of devices (not shown) included in network 162 may include persistent configuration information about communication flows and verification consistent about neighboring devices and neighboring devices, such that the devices may be configured to return to a specified state following a disturbance.

Figure 2:
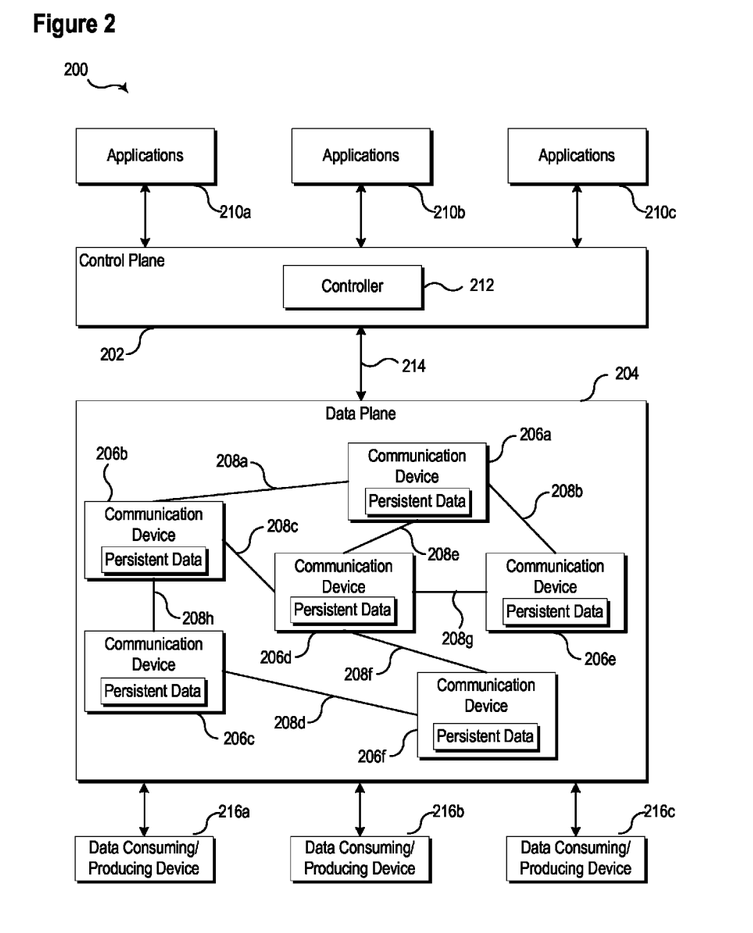
FIG. 2 illustrates a conceptual representation of an SDN architecture including a control plane, a data plane, and a plurality of data consumer/producer devices that may be deployed in an electric power transmission and distribution system consistent with embodiments of the present disclosure.

FIG. 2 illustrates a conceptual representation 200 of an SDN architecture including a control plane 202, a data plane 204, and a plurality of data consumers/producer devices 210a-c that may be deployed in an electric power transmission and distribution system consistent with embodiments of the present disclosure. The control plane 202 directs the flow of data through the data plane 204. More specifically, a controller 212 may communicate with the plurality of communication devices 206a-206f via an interface 214 to establish data flows. The controller may specify rules for routing traffic through the data plane 204 based on a variety of criteria.

As illustrated, the data plane 204 includes a plurality of communication devices 206a-206f that are in communication with one another via a plurality of physical links 208a-208h. In various embodiments, the communication devices 206a-206f may be embodied as switches, multiplexers, and other types of communication devices. The physical links 208a-208h may be embodied as Ethernet, fiber optic, and other forms of data communication channels. As illustrated, the physical links 208a-208h between the communication devices 206a-206f may provide redundant connections such that a failure of one of the physical links 208a-208h is incapable of completely blocking communication with an affected communication device. In some embodiments, the physical links 208a-208h may provide an N−1 redundancy or better.

Communication devices 206a-206f include persistent data that may store information used in the systems and methods disclosed herein. For example, the persistent data may include a record of data flows associated with each of the plurality of communication devices 206a-206f. The persistent data may also include information identifying connected devices. For example, the persistent data in communication device 206b may include information identifying communication devices 206a, 206c, and 206d. Accordingly, communication device 206b may be able to detect changes in any of physical links 208a-208h based on locally stored information that may be available immediately after a disruption.

The plurality of applications 210a-c may represent a variety of applications 210a-c operating in an applications plane. In the SDN architecture illustrated in FIG. 2, controller 212 may expose an application programming interface (API) that services 210a-c can use to configure the data plane 204. In this scenario, controller 212 may act as an interface to the data plane 204 while the control logic resides in the applications 210a-c. The configuration of controller 212 and applications 210a-c may be tailored to meet a wide variety of specific needs.

The data consuming/producing devices 216a-c may represent a variety of devices within an electric power transmission and distribution system that produce or consume data. For example, data consuming/producing devices may, for example, be embodied as a pair of transmission line relays configured to monitor an electrical transmission line. The transmission line relays may monitor various aspects of the electric power flowing through the transmission line (e.g., voltage measurements, current measurements, phase measurements, synchrophasers, etc.) and may communicate the measurements to implement a protection strategy for the transmission line. Traffic between the transmission line relays may be routed through the data plane 204 using a plurality of data flows implemented by controller 212. Of course, data consuming/producing devices 216a-c may be embodied by a wide range of devices consistent with embodiments of the present disclosure.

Figure 3:
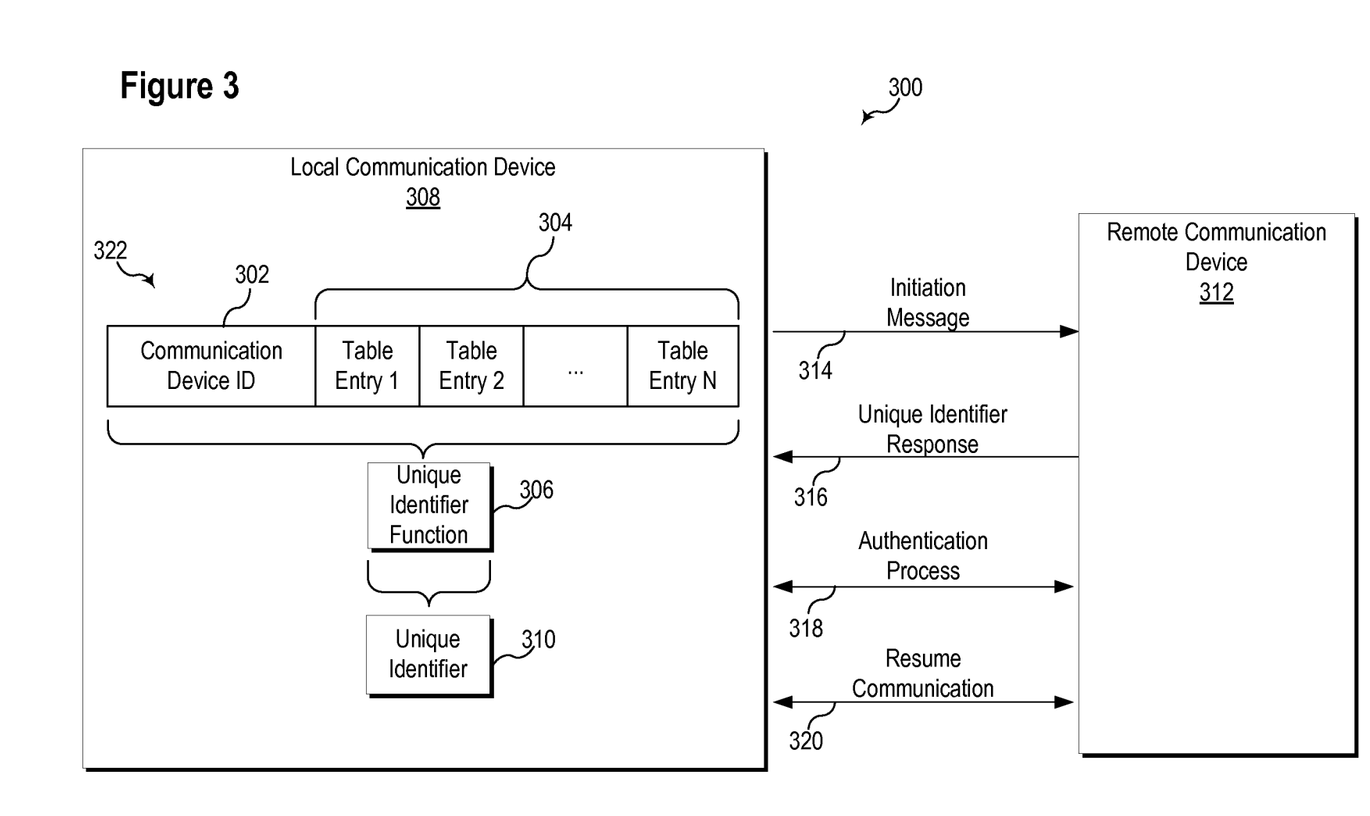
FIG. 3 illustrates a conceptual diagram of a system that may be utilized to directly establish communication between a local communication device and a remote communication device following an event that disrupts communication with an SDN controller consistent with embodiments of the present disclosure.

FIG. 3 illustrates a conceptual diagram of a system 300 that may be utilized to directly establish communication between a local communication device 308 and a remote communication device 312 following an event that disrupts communication with an SDN controller consistent with embodiments of the present disclosure. Local communication device 308 includes a table 322 that may include a plurality of data flows that local communication device 308 may use for routing traffic. In addition, the data stored in table 322 may be utilized to generate a unique identifier consistent with embodiments of the present disclosure. In some embodiments, table 322 may be maintained in a persistent memory of the local communication device 308. As such, table 322 may be immediately available following a disruption regardless of the communication device's ability to communicate with an SDN controller.

Table 322 may include a variety of types of information about the local communication device 308 and its associated data flows. The communication device ID field 302 may be a unique identifier of the local communication device 308. The communication device ID may be generated in various ways consistent with the present disclosure. In one specific embodiment, the communication device ID may be a media access control (MAC) address or other standardized identifier. In other embodiments, the communication device ID may be uniquely assigned by an SDN controller or other device. A plurality of table entries 304 (illustrated as table entries 1 through N) may represent a plurality of data flows implemented by the local communication device 308. The flow entries may represent a plurality of data flows specifying how specific types of data packets are to be routed.

Table 322 may be an input to a unique identifier function 306 that is configured to generate a unique identifier 310. The unique identifier 310 may represent the communication device ID 302 and the specific configuration of the local communication device 308 represented by the plurality of table entries 304. In some embodiments, the unique identifier function 306 may comprise a hash function, although other unique identifier functions may also be used. The unique identifier function 306 may be selected such that a change in any of the communication device ID 302 or the plurality of table entries 304 may result in a change to the unique identifier 310.

After a disruption affecting the local communication device 308, the unique identifier 310 may be regenerated and an initiation message may be transmitted at 314 to a remote communication device 312. The initiation message may include the unique identifier, and accordingly, may provide an indication of the source of the initiation message. In one embodiment, the initiation message may comprise a link layer discovery protocol (LLDP) broadcast according to IEEE standard document 802.1AB.

Remote communication device 312 may have stored the unique identifier prior to the disruption. Remote communication device 312 may compare the previously stored unique identifier to the recently received unique identifier to determine whether the disruption resulted in any changes to the unique identifier. To the extent that the unique identifier is unchanged, remote communication device 312 may directly reestablish communication with the local communication device 308 without the need to communicate with an SDN controller. Following the verification of the unique identifier, remote communication device 312 may respond with a unique identifier response at 316. An authentication process may occur at 318 to secure a communication channel between local communication device 308 and remote communication device 312. In some embodiments the authentication process may comprise a cryptographic exchange in which cryptographic keys are exchanged. In other embodiments, digital signatures may be used in connection with the authentication process. After the authentication process is completed at 318, the local communication device 308 and the remote communication device 312 may resume communication at 320. Following steps 314-320, local communication device 308 and remote communication device 312 may be able to resume communication more quickly than would be possible if communication with the SDN controller (not shown) were required. This may be especially true in the event that the disruption affected the SDN controller or affected the communication link with the SDN controller.

To the extent that remote communication device 312 determines that the unique identifier 310 is changed following the disruption, the remote communication device 312 may be configured to not resume communication with the local communication device 308. Any change in the unique identifier may represent an indication of changes in either the identity of the local communication device 308 or changes in the plurality of table entries 304. The remote communication device 312 may be configured to await communication from the SDN controller in the event of a change in the unique identifier 310. Although such changes may be intentional, the changes could also reflect unauthorized changes intended to compromise the communication channel between the local communication device 308 and the remote communication device 312. In view of the possibility that the changes are unauthorized, the security of the communication link may be increased by only resuming communication between the local communication device 308 and the remote communication device 312 if the unique identifier 310 is unchanged as a result of the disruption. Although FIG. 3 illustrates the process of reestablishing communication between two communication devices (i.e., local communication device 308 and remote communication device 312), the same process may be used to reestablish communication between any number of devices.

Figure 4:
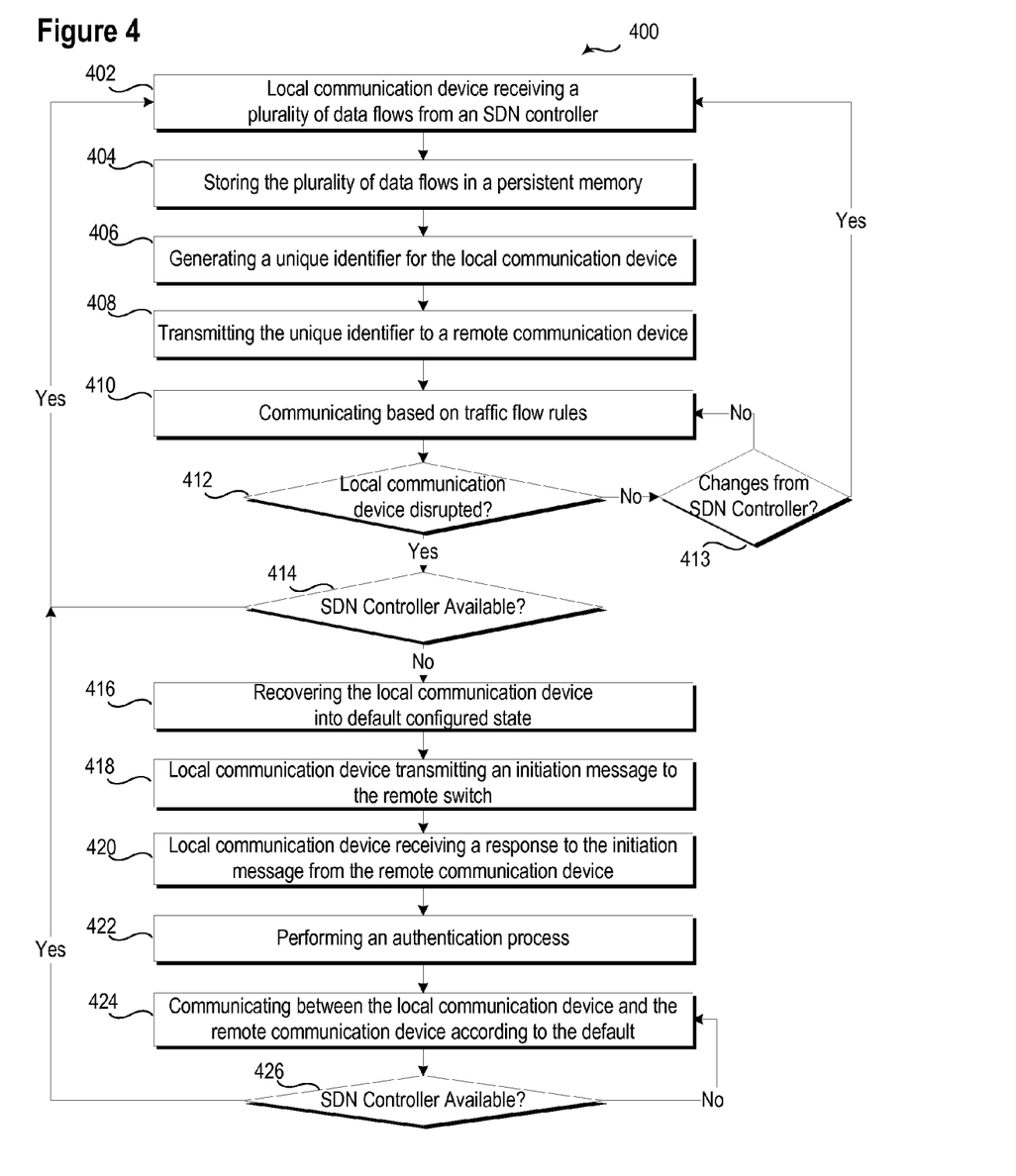
FIG. 4 illustrates a flow chart of a method for directly establishing communication between a local communication device and a remote communication flow following an event that disrupts operation of the local communication device consistent with embodiments of the present disclosure.

FIG. 4 illustrates a flow chart of a method 400 for directly establishing communication between a local communication device and a remote communication flow following an event that disrupts operation of the local communication device consistent with embodiments of the present disclosure. At 402, a local communication device may receive traffic flow rules from an SDN controller. The traffic flow rules may govern the routing of traffic through a data plane of an SDN. The traffic flow rules may be stored in persistent memory in the local communication device at 404. The persistent memory may retain the traffic flow rules through various types of disruptions (e.g., a loss of power, failure of communication links, etc.). At 406, a unique identifier may be generated for the local communication device. In various embodiments, the unique identifier may reflect both an identification of a local communication device and a specific configuration state. The unique identifier may be transmitted to a remote communication device at 408.

At 410, communication may be enabled between the local communication device and the remote communication device based on the traffic flow rules received from the SDN controller. Communication between the local communication device and the remote communication device may continue for an extended period of time.

At 412, it may be determined whether the local communication device has been disrupted. If the local communication device has not been disrupted, method 400 may determine whether any changes to the plurality of data flows have been received from the SDN controller. In some embodiments, the data flows may be periodically changed by the SDN controller. After an update is made, method 400 may return to 402 so that the plurality of data flows stored in persistent memory may be updated.

A disruption at 412 may include a loss of power, a warm or cold restart, a loss of communication with the SDN controller, or a variety of other types of disruptions. Following a disruption, the local communication device may seek to reestablish communication with an SDN controller and to receive configuration instructions from the SDN controller. If the SDN controller is available at 414, method 400 may return to 402. If the SDN controller is not available, the configuration device may recover into a default configured state at 416. In some embodiments, the default configured state 416 may represent a configuration that enables a basic set of features to restore functionality. In other embodiments, the default configured state 416 may represent a configuration that immediately preceded the disruption. In such embodiments, the default configured state 416 may be fully functional. In still further embodiments, the default configured state may represent a prior fully functional state, but the state may not be the most recent state. Such a configuration may reflect a last known good configuration that is unaffected by any recent configuration changes.

At 418, the local communication device may transmit an initiation message to the remote switch. In some embodiments, the initiation message may include the unique identifier. Further, in some embodiments, the initiation message may comprise an LLDP packet. At 420, the local communication device may receive a response to the initiation message from the remote communication device. The response may comprise an acknowledgement that the unique identifier corresponds to an excepted value. At 422, an authentication process may be performed to verify the identity of the remote communication device. Verification of the identity of the remote communication device using the authentication process may help to ensure that the network topology still matches that of the default configured state. In various embodiments, the authentication process may use symmetric or asymmetric key cryptography.

At 424, the location communication device and the remote communication device communicate according to the default configured state. At 426, method 400 may determine whether the SDN controller is available. If the controller becomes available, method 400 may return to 402. Until the controller becomes available, method 400 may continue at 424. In one particular embodiment, a communication device may remain in communication with other communication devices, but may be unable to communicate directly with the SDN controller. In such a scenario, the controller may continue to use the communication device if the device is able to successfully pass the authentication process.

Figure 5:
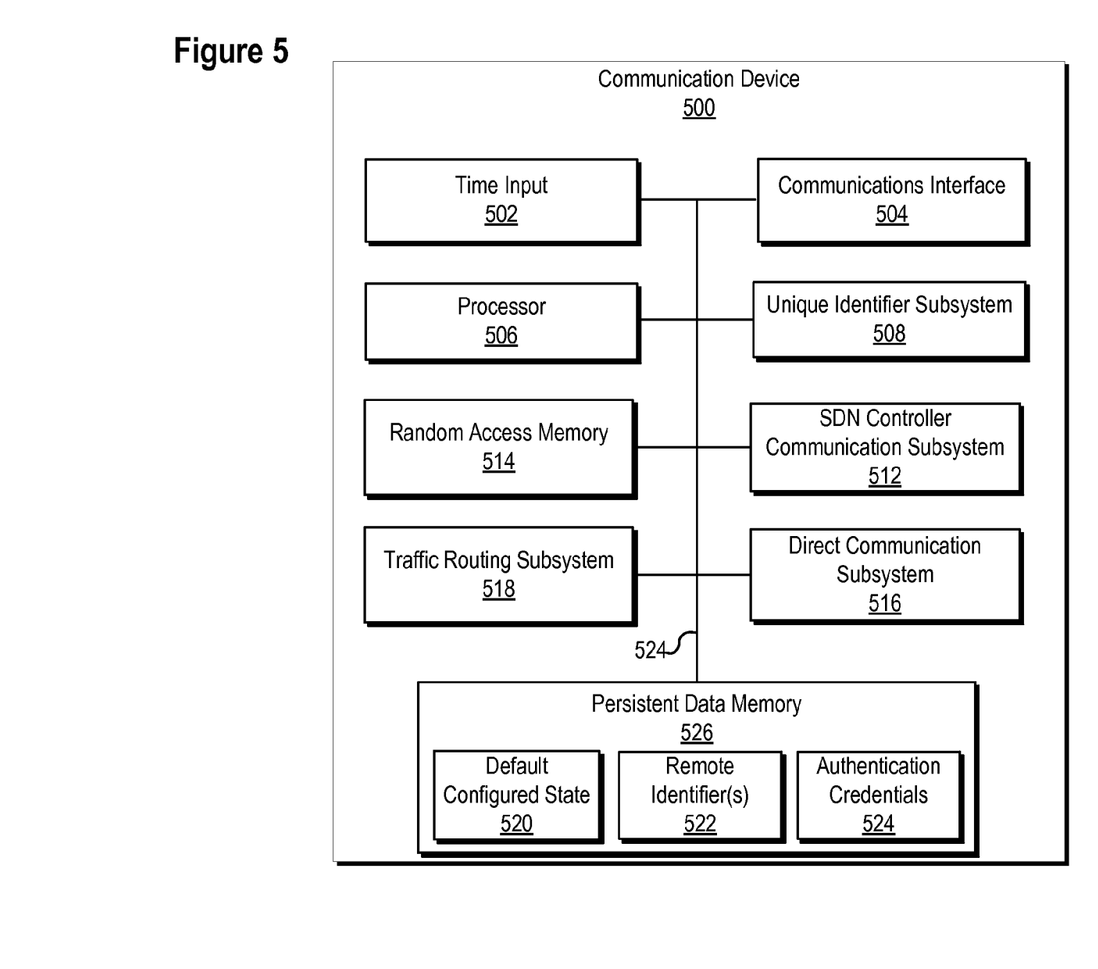
FIG. 5 illustrates a functional block diagram of a communication device configured to directly establish communication with the communication device and a remote device following an event that disrupts communication with an SDN controller consistent with embodiments of the present disclosure.

FIG. 5 illustrates a functional block diagram of a communication device 500 configured to directly establish communication between the communication device 500 and a remote device following an event that disrupts communication with an SDN controller consistent with embodiments of the present disclosure. In some embodiments, communication device 500 may be implemented using hardware, software, firmware, and/or any combination thereof. Moreover, certain components or functions described herein may be associated with other devices or performed by other devices.

The specifically illustrated configuration is merely representative of one embodiment consistent with the present disclosure.

Communication device 500 includes a communications interface 504 configured to communicate with other devices (not shown) associated with an electric power transmission and distribution system. Communications interface 504 may facilitate communications with multiple devices. Communication device 500 may further include a time input 502, which may be used to receive a time signal (e.g., a common time reference) allowing communication device 500 to apply a time-stamp received data. In certain embodiments, a common time reference may be received via communications interface 504, and accordingly, a separate time input may not be required. One such embodiment may employ the IEEE 1588 protocol.

Processor 506 may be configured to process communications received via communications interface 504 and time input 502 and to coordinate the operation of the other components of communication device 500. Processor 506 may operate using any number of processing rates and architectures. Processor 506 may be configured to perform any of the various algorithms and calculations described herein. Processor 506 may be embodied as a general purpose integrated circuit, an application specific integrated circuit, a field-programmable gate array, and/or any other suitable programmable logic device.

Instructions to be executed by processor 506 may be stored in random access memory 514 (RAM). Such instructions may include information for routing data packets received via communications interface 504 based on a plurality of data flows. In some embodiments, the data flows may also be stored in RAM 514.

A unique identifier subsystem 508 may be configured to generate a unique identifier associated with communication device 500. The unique identifier subsystem 508 may be configured to generate a unique identifier that represents the communication device 500 and the specific configuration of the communication device 500. In some embodiments, the unique identifier subsystem 508 may generate the unique identifier using a hash function that utilizes an identifier of communication device 500 and configuration information associated with communication device 500. In other embodiments, other techniques may be utilized to generate the unique identifier.

An SDN controller communication subsystem 512 may be configured to communicate with an SDN controller and to configure communication 500 as based on instructions received from the SDN controller. In various embodiments, SDN controller communication subsystem 512 may be configured to receive a plurality of data flows and to configure communication device 500 to implement the data flows. In various embodiments, the data flows may be permanent (i.e., data flows with no expiration time), or the data flows may be temporary (i.e., data flows that may expire after a certain period of time).

A direct communication subsystem 516 may be configured to establish direct communication channels with other communication devices during times when communications with an SDN controller are disrupted. In various embodiments, direct communication subsystem 516 may be configured to implement the method of directly establishing communication between a local communication device and a remote communication flow following an event that disrupts communication with an SDN controller illustrated in FIG. 4.

Returning to a discussion of FIG. 5, a traffic routing subsystem 518 may be configured to process the data communications received via communications interface 504 and to appropriately route such communications based on applicable data flows.

Persistent data memory 526 may be configured to retain certain information following a disruption (e.g., a loss of power, failure of a communication link with an SDN controller, etc.). In the illustrated embodiment, persistent data storage retains a default configured state 520 and remote identifier(s) 522. The default configured state 520 may represent a basic configuration that enables a basic set of features. In other embodiments, the default configured state 520 may represent the configuration that immediately preceded the disruption. In such embodiments, the default configured state 520 may be fully functional. In still further embodiments, the default configured state 520 may represent a prior fully functional state, but not the most recent state. Such a configuration may reflect a last known good configuration that is unaffected by any recent configuration changes.

The remote identifier(s) 522 stored in persistent data memory 526 may represent unique identifiers associated with remote communication devices (not shown) and may be used to verify the identity and configuration of remote devices. The remote identifier(s) 522 may be used to reestablish direct communication with the remote communication devices when communication with an SDN is unavailable.

The authentication credentials 524 stored in persistent data memory 526 may be utilized when reestablishing communication after a disruption. As discussed in connection with FIG. 3, certain embodiments consistent with the present disclosure may include an authentication process. In various embodiments, the authentication credentials 524 may be generated by the SDN controller. Authentication credentials 524 may include cryptographic keys or digital signatures in various embodiments.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A communication device, comprising:
    a data bus;
    a communication interface in communication with the data bus;
    a persistent data memory in communication with the data bus;
    a processor in communication with the data bus and configured execute instructions to cause:
        an SDN controller communication subsystem in communication with the data bus to receive a plurality of data flows and authentication credentials from an SDN controller and to store the plurality of data flows and the authentication credentials in the persistent data memory;
        a unique identifier subsystem to generate a unique identifier for the communication device and to transmit the unique identifier to a remote communication device through the communication interface;

a traffic routing subsystem to communicate with the remote communication device based on the plurality of data flows;
a direct communication subsystem to:
identify the occurrence of a disruption affecting the communication device and to determine that communication with the SDN controller is unavailable,
recover the communication device into a default configured state based on the plurality of data flows in the persistent data memory;
transmit a link layer discovery packet comprising the unique identifier to the remote communication device after the disruption;
receive a response to the link layer discovery packet from the remote communication device;
perform an authentication process with the remote communication device using the authentication credentials; and
reestablish communication with the remote communication device.

2. A method of establishing communication between a local communication device and a remote communication device in a software defined network (SDN), the method comprising:
receiving at a local communication device a plurality of data flows from an SDN controller;
storing the plurality of data flows in a persistent data memory;
generating a unique identifier for the local communication device;
transmitting the unique identifier to remote communication device;
communicating with the remote communication device based on the plurality of data flows;
identifying the occurrence of a disruption affecting the local communication device;
determining that the SDN controller is unavailable;
recovering the local communication device into a default configured state based on the plurality of data flows in the persistent data memory;
transmitting the unique identifier to the remote communication device after the disruption;
the remote communication device verifying the identity of the local communication device based on the unique identifier; and
reestablishing communication with the remote communication device.

3. A method of claim 2, wherein the unique identifier represents an identifier of the local communication device and a configuration of the local communication device.

4. The method of claim 3, wherein the configuration of the local communication device comprises the plurality of data flows.

5. The method of claim 3, further comprising generating the unique identifier using a hash function.

6. The method of claim 2, wherein the disruption comprises one of a loss of power, a restart of the local communication device, and a loss of communication with the SDN controller.

7. The method of claim 2, wherein reestablishing communication with the remote communication device further comprises:
receiving a response from the remote communication device to transmission of the unique identifier after the disruption; and
performing an authentication process.

8. The method of claim 7, further comprising:
receiving authentication credentials from the SDN controller, the authentication credentials comprising one of a cryptographic key and a digital signature;
storing the cryptographic credentials in the persistent data memory; and
providing the cryptographic credentials during the authentication process.

9. The method of claim 2, further comprising transmitting a link layer discovery packet after the disruption.

10. The method of claim 9, wherein the link layer discovery packet comprises the unique identifier.

11. A communication device configured to establish communication with a remote communication device in a software defined network (SDN), comprising:
a data bus;
a communication interface in communication with the data bus;
a processor in communication with the data bus and configured to process communications received via the communication interface;
a persistent data memory in communication with the data bus;
an SDN controller communication subsystem in communication with the data bus and configured to receive a plurality of data flows from an SDN controller and to store the plurality of data flows in the persistent data memory;
a unique identifier subsystem configured to generate a unique identifier for the communication device and to transmit the unique identifier to a remote communication device through the communication interface;
a traffic routing subsystem configured to communicate with the remote communication device based on the plurality of data flows;
a direct communication subsystem configured to:
identify the occurrence of a disruption affecting the communication device, to determine that the SDN controller is unavailable,
recover the communication device into a default configured state based on the plurality of data flows in the persistent data memory;
transmit the unique identifier to the remote communication device after the disruption; and
reestablish communication with the remote communication device based on verification of the identity of the communication device using the unique identifier.

12. The communication device of claim 11, wherein the unique identifier represents an identifier of the communication device and a configuration the communication device.

13. The communication device of claim 12, wherein the configuration of the communication device comprises the plurality of data flows.

14. The communication device of claim 12, wherein the unique identifier subsystem is configured to generate the unique identifier using a hash function.

15. The communication device of claim 11, wherein the disruption comprises one of a loss of power, a restart of the communication device, and a loss of communication with the SDN controller.

16. The communication device of claim 11, wherein the direct communication subsystem is further configured to:
receive a response from the remote communication device to transmission of the unique identifier after the disruption; and
perform an authentication process.

17. The communication device of claim 16, wherein the SDN controller communication subsystem is further configured to receive authentication credentials from the SDN controller and to store the authentication credentials in the persistent data memory; and wherein the direct communication subsystem is further configured to provide the authentication credentials during the authentication process.

18. The communication device of claim 11, wherein the direct communication subsystem is further configured to transmit a link layer discovery packet after the disruption.

19. The communication device of claim 18, wherein the link layer discovery packet comprises the unique identifier.

20. The communication device of claim 11, wherein the default configured state corresponds to a configuration of the communication device immediately preceding the disruption.

* * * * *